(12) United States Patent
Kim

(10) Patent No.: US 11,142,881 B2
(45) Date of Patent: Oct. 12, 2021

(54) EXCAVATOR HAVING ROTATABLE ARM

(71) Applicant: Young Gil Kim, Cheongju-si (KR)

(72) Inventor: Young Gil Kim, Cheongju-si (KR)

( * ) Notice: Subject to any disclaimer, the term of this patent is extended or adjusted under 35 U.S.C. 154(b) by 489 days.

(21) Appl. No.: 15/747,359

(22) PCT Filed: Aug. 29, 2016

(86) PCT No.: PCT/KR2016/009579
§ 371 (c)(1),
(2) Date: Jan. 24, 2018

(87) PCT Pub. No.: WO2017/043794
PCT Pub. Date: Mar. 16, 2017

(65) Prior Publication Data
US 2018/0223499 A1  Aug. 9, 2018

(30) Foreign Application Priority Data

Sep. 9, 2015  (KR) .................. 10-2015-0127630

(51) Int. Cl.
*E02F 3/30*  (2006.01)
*E02F 3/38*  (2006.01)
(Continued)

(52) U.S. Cl.
CPC .............. *E02F 3/303* (2013.01); *E02F 3/308* (2013.01); *E02F 3/32* (2013.01); *E02F 3/38* (2013.01);
(Continued)

(58) Field of Classification Search
None
See application file for complete search history.

(56) References Cited

U.S. PATENT DOCUMENTS

| | | | | |
|---|---|---|---|---|
| 5,158,420 A | * | 10/1992 | Weyer | E02F 3/303 414/694 |
| 5,267,504 A | * | 12/1993 | Weyer | E02F 3/3677 92/31 |

(Continued)

FOREIGN PATENT DOCUMENTS

| | | | | |
|---|---|---|---|---|
| JP | S57140436 A | * | 8/1982 | ............ E02F 3/303 |
| JP | 403014737 A | * | 1/1991 | ............ B60N 2/20 |

(Continued)

OTHER PUBLICATIONS

Wikipedia, May 2020, "Excavator_-_Wikipedia.pdf", all pages.*

*Primary Examiner* — Michael S Lowe
(74) *Attorney, Agent, or Firm* — KORUS Patent, LLC; Seong Il Jeong

(57) ABSTRACT

An excavator having a rotatable arm is disclosed. The excavator includes: a vehicle body configured to have a hydraulic pump; a boom connected to the vehicle body at one end thereof; a boom cylinder coupled between the vehicle body and the boom, and configured to receive hydraulic energy from the hydraulic pump and operate the boom; an arm connected to the other end of the boom; an arm cylinder coupled between the boom and the arm, and configured to receive hydraulic energy from the hydraulic pump and operate the arm; a bucket connected to an end of the arm; and a bucket cylinder coupled between the arm and the bucket, and configured to receive hydraulic energy from the hydraulic pump and operate the bucket. The arm includes: a first body, a second body, and a rotation module configured to enable the rotational movement of the second body.

6 Claims, 15 Drawing Sheets

(51) Int. Cl.

| | | |
|---|---|---|
| *E02F 9/00* | (2006.01) | |
| *E02F 3/32* | (2006.01) | |
| *E02F 9/22* | (2006.01) | |
| *F15B 11/16* | (2006.01) | |
| *F16H 1/06* | (2006.01) | |
| *E02F 3/42* | (2006.01) | |

(52) U.S. Cl.
CPC ............... *E02F 9/006* (2013.01); *E02F 9/22* (2013.01); *E02F 9/2267* (2013.01); *F15B 11/16* (2013.01); *F16H 1/06* (2013.01); *E02F 3/425* (2013.01); *E02F 9/2271* (2013.01)

(56) References Cited

U.S. PATENT DOCUMENTS

| | | | | |
|---|---|---|---|---|
| 6,578,296 | B2* | 6/2003 | Kimoto | ................. E02F 9/2267 37/443 |
| 7,798,738 | B2* | 9/2010 | Kawamoto | ............. B66C 23/84 403/38 |
| 2002/0062587 | A1* | 5/2002 | Kimoto | ................. E02F 9/2271 37/466 |
| 2018/0038064 | A1* | 2/2018 | Jung | ......................... F16H 1/16 |

FOREIGN PATENT DOCUMENTS

| | | | |
|---|---|---|---|
| JP | H06-049550 U | 7/1994 | |
| JP | H06-085451 U | 12/1994 | |
| JP | H11131825 A * | 5/1999 | ............. E02F 3/965 |
| JP | 2009-002399 A | 1/2009 | |
| KR | 20030023269 A * | 3/2003 | ............ E02F 3/3677 |
| KR | 20-0404282 Y1 | 12/2005 | |
| KR | 10-2011-0006779 A | 1/2011 | |

* cited by examiner

EXCAVATOR HAVING ROTATABLE ARM

TECHNICAL FIELD

The present invention relates to an excavator, and more specifically to an excavator having a rotatable arm.

BACKGROUND ART

In FIG. 1, a conventional excavator is shown. Such excavators are used for various purposes, including soil preparation work, landscaping work, demolition work, compaction work, crushing work, etc. as well as basic excavation work. Furthermore, working devices (attachments), including various types of buckets 600, breakers, crushers, cutters, rippers, grabs, compacts, etc., each suitable for the characteristics of each type of work are developed in various forms, and are widely used at industrial sites.

The excavators are limited to movement in a two-dimensional plane due to the basic structure of the excavators, i.e., the structure of an actuation part including a boom 200, an arm 400, a bucket 600, hydraulic cylinders 300, 500 and 700, etc. In other words, the excavators can basically perform only vertical operation. Reference number 100 of FIG. 1 designates a vehicle body 100 including an operator's cab.

For this reason, in order to implement three-dimensional work at various angles, each working device basically needs to be equipped with a rotation device. Otherwise work itself in a specific direction must be renounced.

DISCLOSURE

Technical Problem

The present invention is intended to provide an excavator having a rotatable arm in order to implement three-dimensional work.

Technical Solution

According to an aspect of the present invention, there is provided an excavator having a rotatable arm, the excavator including: a vehicle body configured to have a hydraulic pump; a boom connected to the vehicle body at one end thereof; a boom cylinder coupled between the vehicle body and the boom, and configured to receive hydraulic energy from the hydraulic pump and operate the boom; an arm connected to the other end of the boom; an arm cylinder coupled between the boom and the arm, and configured to receive hydraulic energy from the hydraulic pump and operate the arm; a bucket connected to an end of the arm; and a bucket cylinder coupled between the arm and the bucket, and configured to receive hydraulic energy from the hydraulic pump and operate the bucket; wherein the arm includes: a first body connected to the other end of the boom; a second body configured such that one end thereof is coupled to the first body so that it is rotatable through 360 degrees and the other end thereof is connected to the bucket; and a rotation module interposed between the first body and the second body, and configured to enable the rotational movement of the second body; and wherein the rotation module includes: a bearing configured to include an inner ring coupled to the first body and an outer ring rotatably coupled to the inner ring and coupled to the second body; a hydraulic motor coupled to the first body, and configured to receive hydraulic energy from the hydraulic pump and generate rotating force intended for the rotational movement of the second body; a drive gear coupled to the shaft of the hydraulic motor; and a driven gear formed on the outer circumferential surface of the outer ring, and configured to be engaged with the drive gear and receive the rotating force of the hydraulic motor through the drive gear.

The arm may further include a rotary joint disposed between the first body and the second body and configured to transfer oil so that the transfer of hydraulic energy from the hydraulic pump to the arm cylinder and the bucket cylinder can be maintained during the rotational movement of the second body.

The rotary joint may include: a fixed part configured such that one side thereof is inserted into the first body and the other side thereof is inserted into the second body; and a rotating part configured to surround the outer circumferential surface of the other side of the fixed part, coupled to the fixed part so that it can be rotated through 360 degrees, and configured to be rotated along with the second body in an integrated manner; flow passages configured to transfer oil fed from the hydraulic pump may be formed in the fixed part; the flow passages may be configured to extend from one side of the fixed part in a direction toward the other side of the fixed part through the inside of the fixed part and to communicate with the outer circumferential surface of the fixed part, and channels connected to the flow passages and shaped to surround the outer circumferential surface of the fixed part may be formed through the outer circumferential surface of the other side of the fixed part; and ports configured to communicate with the respective channels and transfer oil to the arm cylinder or bucket cylinder may be formed on the rotating part.

The flow passages, the channels, and the ports may be each plural in number, and the numbers of flow passages, channels, and ports may be the same as one.

A sealing groove may be formed between each adjacent two of the plurality of channels; and a sealing member may be inserted into the sealing groove.

A catch protrusion may be formed on the outer circumferential surface of the rotating part; and a stopper configured to be engaged with the catch protrusion so that the rotating part is rotated along with the second body in an integrated manner may be formed on the second body.

The rotation module may further include a relief valve configured to prevent the pressure of oil fed to the hydraulic motor from increasing above a preset threshold value.

The rotation module may further include a hydraulic brake configured to maintain the rotated angle of the second body by blocking the rotational movement of the shaft of the hydraulic motor when the hydraulic motor does not operate.

The arm may further include: a motor bracket configured to protrude outward from the first body and protect the hydraulic motor 431; and a first gear cover configured to be coupled to the motor bracket and protect the drive gear.

The arm may further include a second gear cover configured to be coupled to the first body and protect the driven gear.

Advantageous Effects

According to the preferred embodiment of the present invention, the arm can be freely rotated, and thus a three-dimensional work environment can be implemented.

BEST MODE

Figure 1:
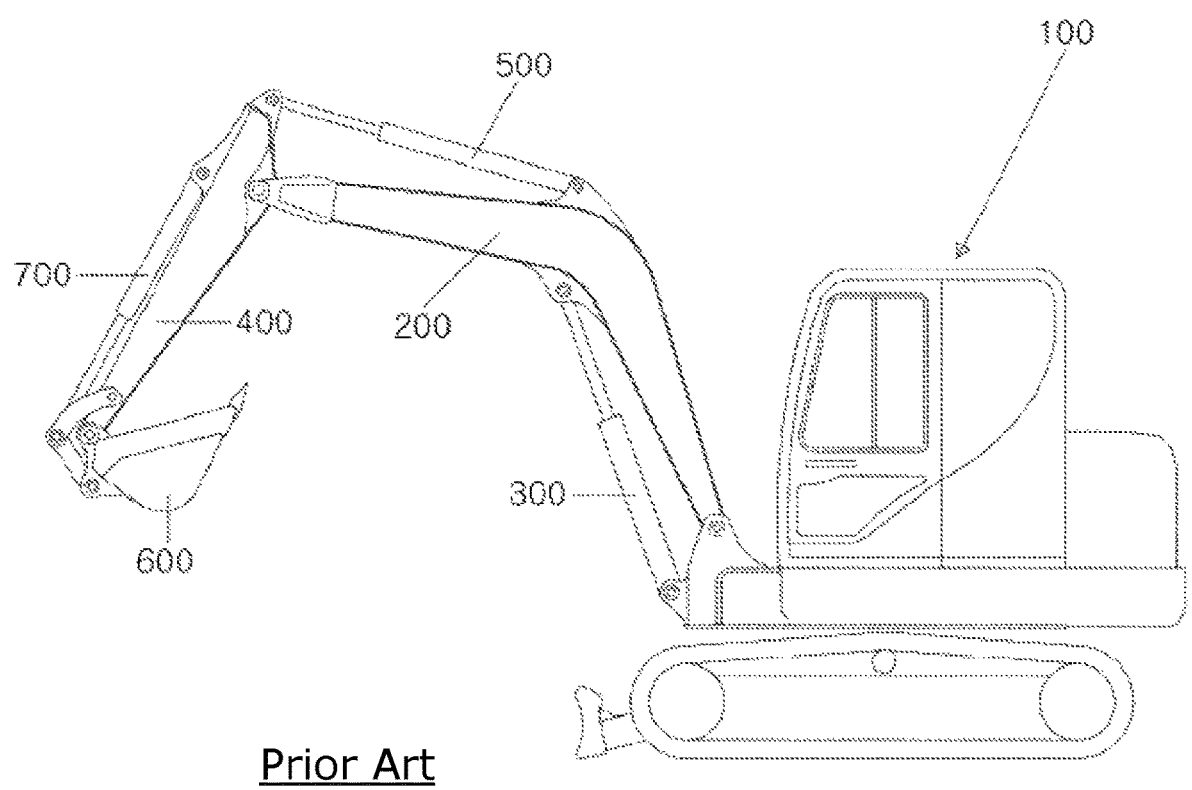
FIG. 1 is a side view showing a conventional excavator.

The present invention may be subjected to various alterations, and may have various embodiments. Specific embodiments will be illustrated in the drawings, and will be described in detail. However, this is not intended to limit the present invention to the specific embodiments, and it should be understood that the present invention encompasses all alterations, equivalents and substitutions falling within the spirit and technical range of the present invention. In the following description of the present invention, when a detailed description of a related well-known configuration is determined to make the gist of the present embodiment obscure, the detailed description will be omitted.

Although the terms "first," "second," etc. may be used to describe various components, the components should not be limited by these terms. These terms are each used only to distinguish one component from other components.

The terms used herein are used only to describe specific embodiments, and are not intended to limit the present invention. A singular expression includes a plural expression unless the context clearly indicates otherwise. In the present specification, it should be understood that the terms such as "include" or "have" are merely intended to indicate that features, numbers, steps, operations, components, parts, or combinations thereof are present, and are not intended to exclude possibility that one or more other features, numbers, steps, operations, components, parts, or combinations thereof will be present or added.

A preferred embodiment of an excavator according to the present invention will be described in detail below with reference to the accompanying drawings. In the description given with reference to the accompanying drawings, the same reference numerals will be assigned to the same or corresponding components, and redundant descriptions thereof will be omitted.

As shown in FIG. 1, the excavator includes, as the components thereof: a vehicle body 100 configured to have a hydraulic pump; a boom 200 connected to the vehicle body 100 at one end thereof; a boom cylinder 300 coupled between the vehicle body 100 and the boom 200, and configured to receive hydraulic energy from the hydraulic pump and operate the boom 200; an arm 400 connected to the other end of the boom 200; an arm cylinder 500 coupled between the boom 200 and the arm 400, and configured to receive hydraulic energy from the hydraulic pump and operate the arm 400; a bucket 600 connected to an end of the arm 400; and a bucket cylinder 700 coupled between the arm 400 and the bucket 600, and configured to receive hydraulic energy from the hydraulic pump and operate the bucket 600.

The excavator having the structure shown in FIG. 1 is limited to movement in a two-dimensional plane due to the structure of an actuation part including the boom 200, the arm 400, the bucket 600, etc. In other words, only vertical operation can be performed. For this reason, in order to implement three-dimensional work at various angles, each working device basically needs to be equipped with a rotation device. Otherwise work itself in a specific direction must be renounced.

Figure 2:
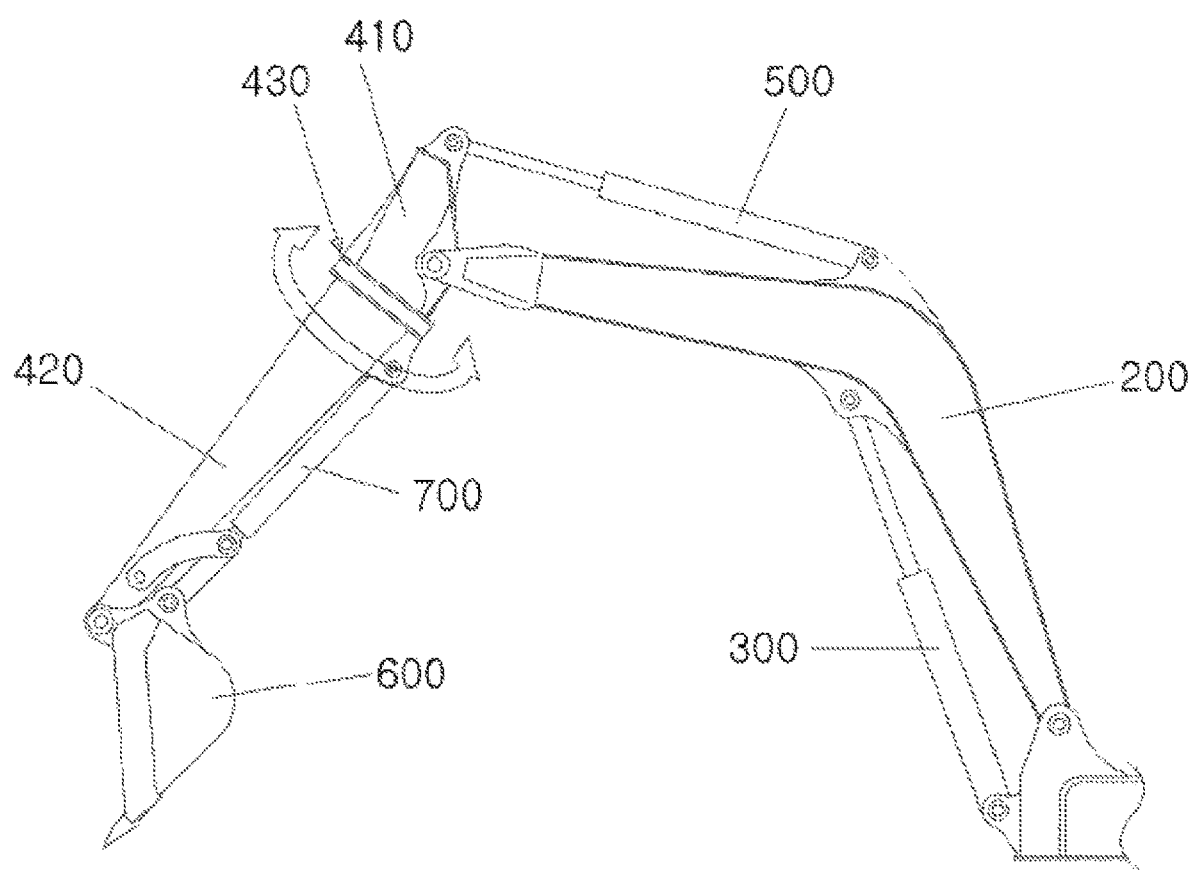
FIG. 2 is a view showing an excavator according to an embodiment of the present invention.

In the present embodiment, a structure in which the arm 400 can be rotated through 360 degrees is proposed in order to overcome the above problem. When the arm 400 is freely rotated through 360 degrees around a lengthwise axis, as shown in FIG. 2, work can be performed in various directions including vertical and lateral directions by only simple manipulation, and thus the efficiency of work can be improved.

In order to implement the above structure, the arm 400 of the excavator according to the present embodiment includes: a first body 410 connected to the other end of the boom 200; a second body 420 configured such that one end thereof is coupled to the first body 410 so that it is rotatable through 360 degrees and the other end thereof is connected to the bucket 600; and a rotation module 430 interposed between the first body 410 and the second body 420, and configured to enable the rotational movement of the second body 420. When rotation operation is implemented by dividing the structure of the arm 400 into two parts, i.e., the first body 410 and the second body 420 as described above, there is the advantage of implementing a three-dimensional work environment while minimizing a change in design compared to the conventional structure.

Figure 3:
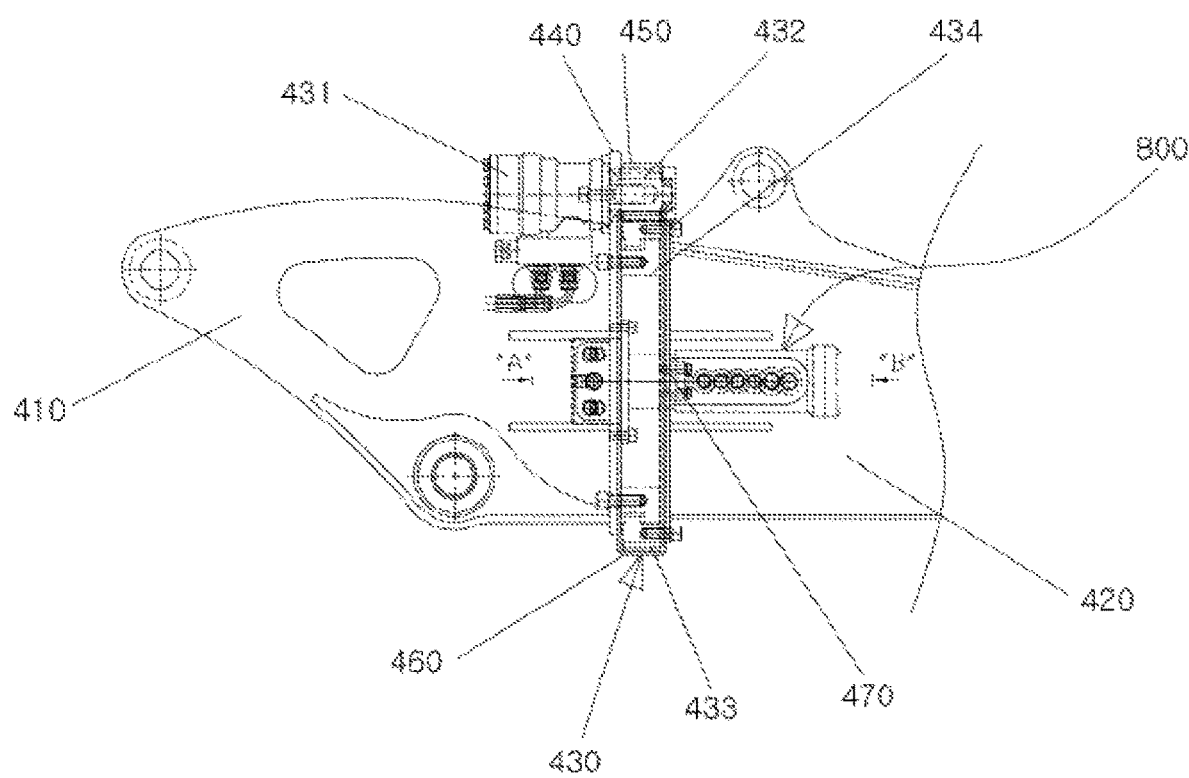
FIG. 3 is a front view showing the arm of the excavator according to the embodiment of the present invention.

As shown in FIG. 3, in an embodiment of the present invention, a specific configuration of the rotation module 430 includes: a hydraulic motor 431 configured to generate rotating force; a drive gear 432 and a driven gear 433 configured to transfer rotating force; and a bearing 434 configured such that the driven gear 433 is formed on the outer circumferential surface thereof. The individual components of the rotation module 430 according to the embodiment are described more specifically below.

The rotation of the arm 400, i.e., the operation of the rotation module 430, may be implemented by the manipulation of an operator in the operator's cab located in the vehicle body 100. Generally, the work of the excavator is performed using hydraulic pressure, and thus the vehicle body 100 is equipped with a hydraulic pump. In the case of the present embodiment, the hydraulic motor 431 using oil of the above-described hydraulic pump is used as the power source of the rotation module 430.

Figure 4:
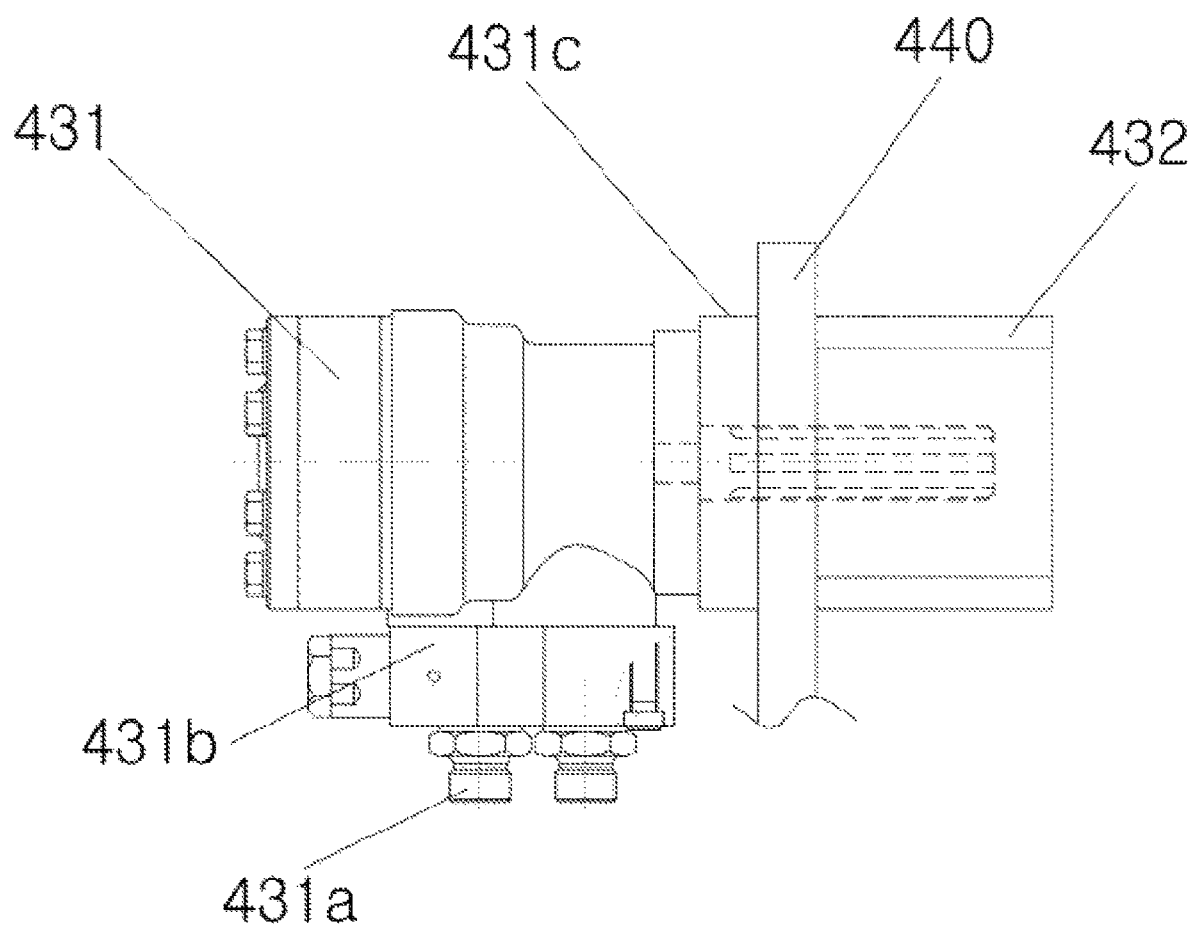
FIG. 4 is an enlarged view showing the hydraulic motor portion of the excavator according to the embodiment of the present invention.

The hydraulic motor 431 is coupled to the first body 410, receives hydraulic energy from the hydraulic pump, and generates rotating force intended for the rotational movement of the second body 420. In other words, the hydraulic motor 431 is installed on the first body 410, and generates rotating force using hydraulic pressure fed from the hydraulic pump of the vehicle body 100. As shown in FIGS. 3 and 4, the rotating force generated as described above is transferred to the drive gear 432 coupled to the shaft of the hydraulic motor 431.

Figure 5:
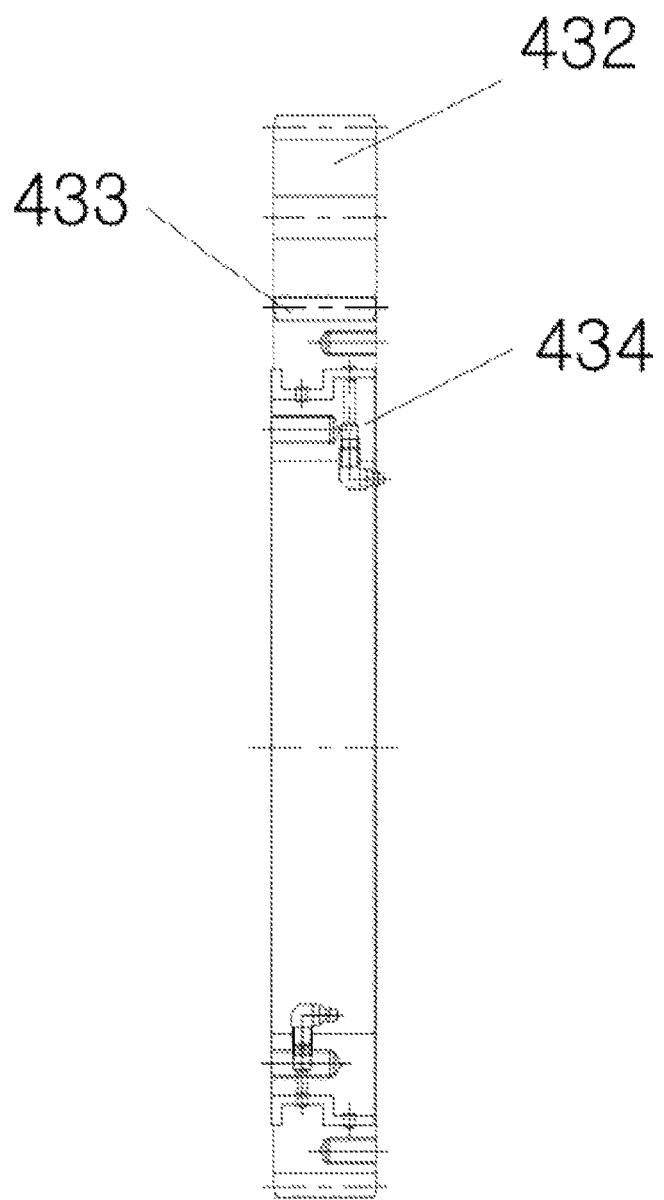
FIGS. 5 and 6 are views showing the bearing, driven gear and drive gear of the excavator according to the embodiment of the present invention.

Meanwhile, as shown in FIGS. 3 and 5, the bearing 434 may be disposed between the first body 410 and the second body 420, and may include an inner ring coupled to the first body 410 and an outer ring rotatably coupled to the inner ring and coupled to the second body 420.

Figure 6:
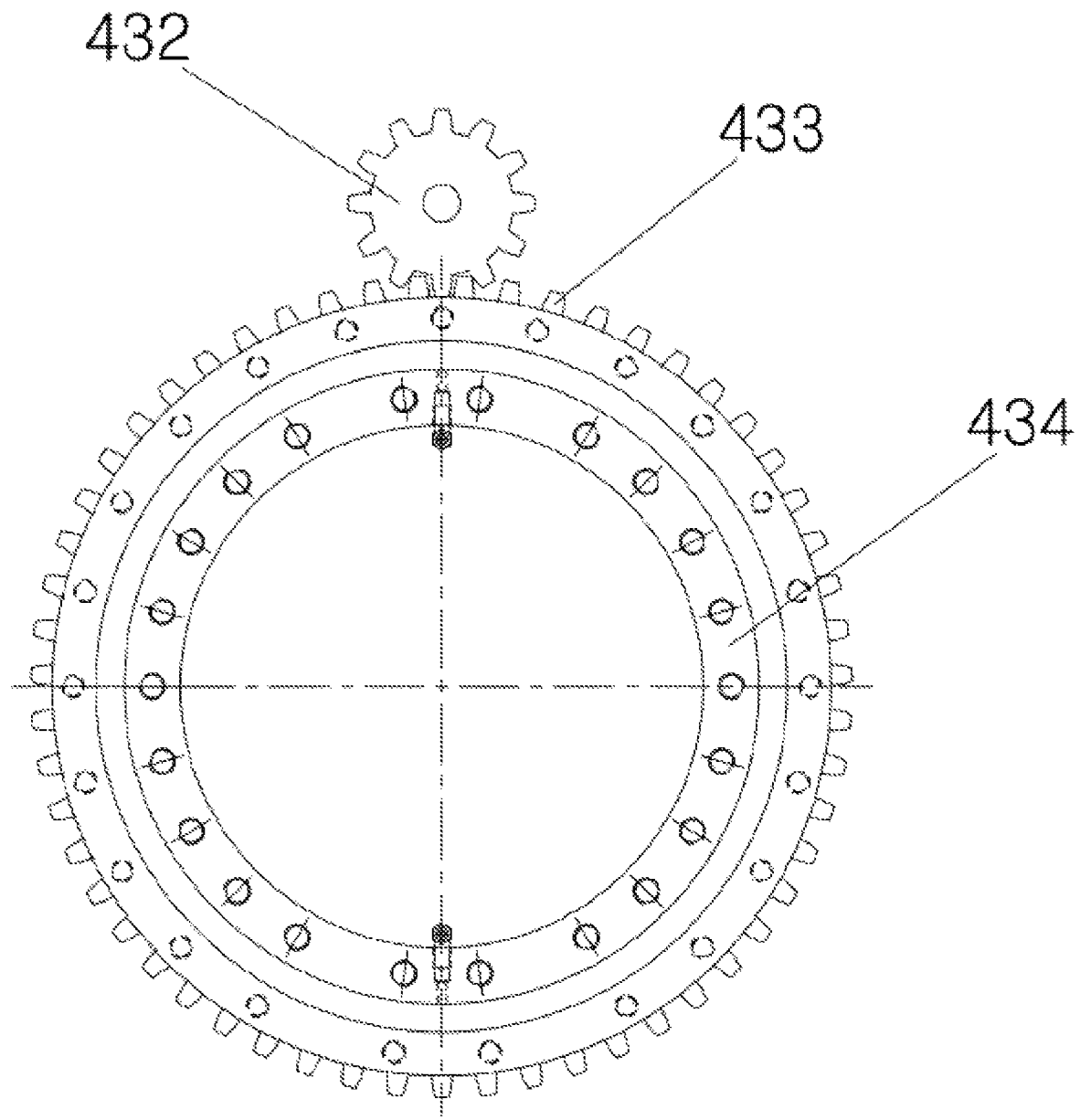

In this case, the driven gear 433 may be formed on the outer circumferential surface of the outer ring of the bearing 434, as shown in FIGS. 5 and 6. The driven gear 433 may be formed on the outer circumferential surface of the outer ring of the bearing 434, and may be engaged with the above-described drive gear 432. Accordingly, the rotating force of the hydraulic motor 431 is transferred to the outer ring of the bearing 434 through the drive gear 432 and the driven gear 433, and is finally transferred to the second body 420 coupled to the outer ring of the bearing 434, thereby rotating the second body 420 relative to the first body 410.

When the driven gear 433 is formed on the outer ring of the bearing 434 as described above and is engaged with the drive gear 432 configured to receive rotating force directly from the hydraulic motor 431 in a circumscriptive manner, a power transfer structure can be simplified, and thus future maintenance and repair can be significantly advantageously performed and loss of power can be also minimized.

Meanwhile, as shown in FIG. 4, a relief valve 431*b* may be provided in the oil entrance 431*a* of the hydraulic motor 431. The relief valve 431*b* prevents the pressure of oil, fed to the hydraulic motor, from increasing above a preset threshold value, thereby enabling erroneous operation, failures, etc. attributable to excessive pressure to be minimized.

Furthermore, as shown in FIG. 4, a hydraulic brake 431*c* may be provided on the shaft of the hydraulic motor 431. The hydraulic brake 431*c* prevents the second body 420 from being rotated forward or backward by blocking the rotational movement of the shaft of the hydraulic motor 431 when the hydraulic motor 431 does not operate (in a neutral state), thereby maintaining the rotated angle (rotated location) of the second body 420 in a current state.

Meanwhile, the arm 400 may further include: a motor bracket 440 configured to protect the hydraulic motor 431; a first gear cover 450 configured to protect the drive gear 432; and a second gear cover 460 configured to protect the driven gear 433.

Figure 7:
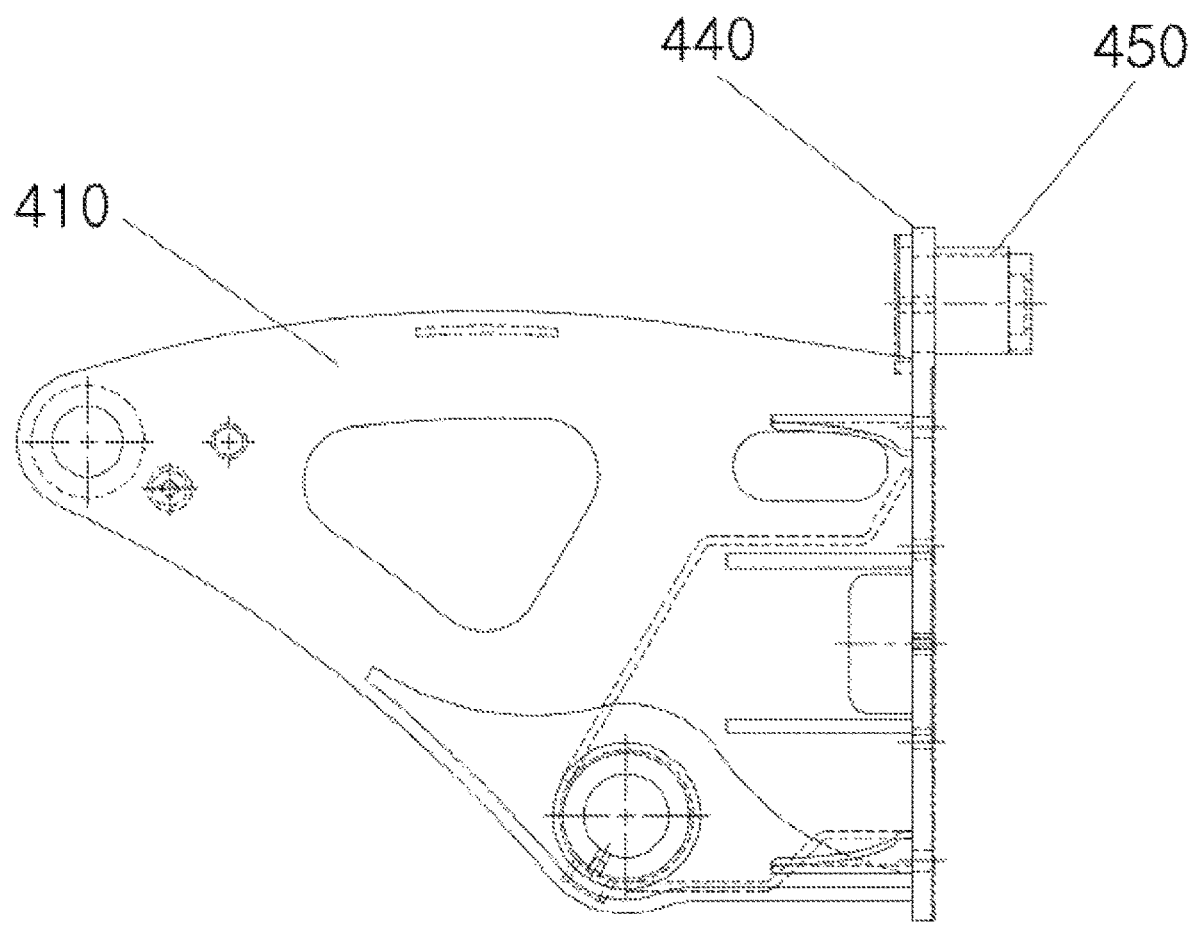
FIGS. 7 and 8 are front and side views showing the first body of the excavator according to the embodiment of the present invention, respectively.
Figure 8:
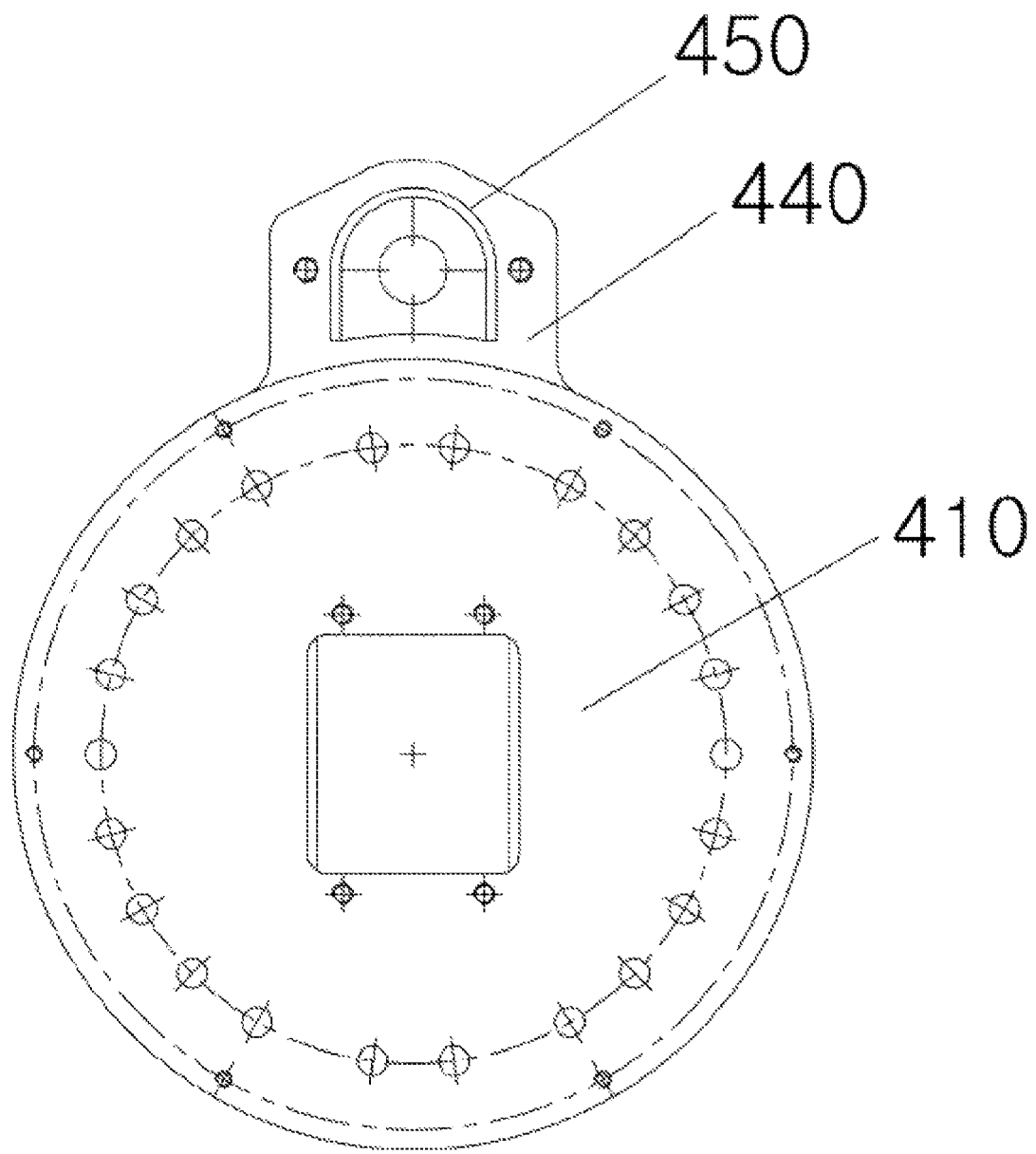

As shown in FIGS. 7 and 8, a motor bracket 440 configured to protrude outward may be formed on the first body 410. As shown in FIGS. 3 and 4, the hydraulic motor 431 may be installed on the motor bracket 440 by means of a fastening means, such as a bolt or the like.

Furthermore, as shown in FIGS. 3, 7 and 8, a first gear cover 450 configured to surround the outer circumferential surface of the drive gear 432 may be coupled to the motor bracket 440. The most outer circumferential surface of the drive gear 432 can be surrounded by the first gear cover 450, thereby enabling the drive gear 432 from being effectively protected from external contamination or impact.

Figure 9:
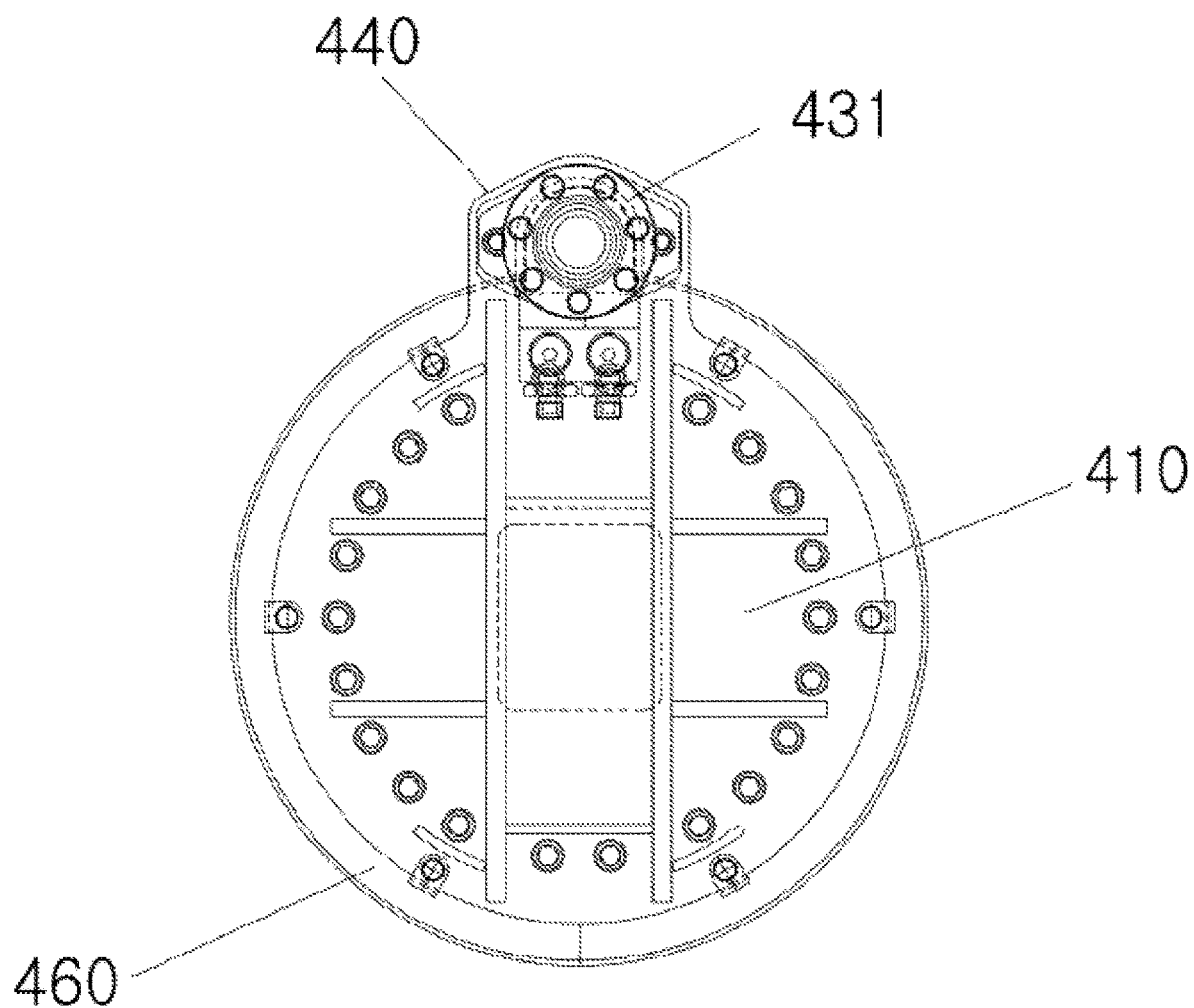
FIG. 9 is a side view viewed from direction "A" of FIG. 3.
Figure 10:
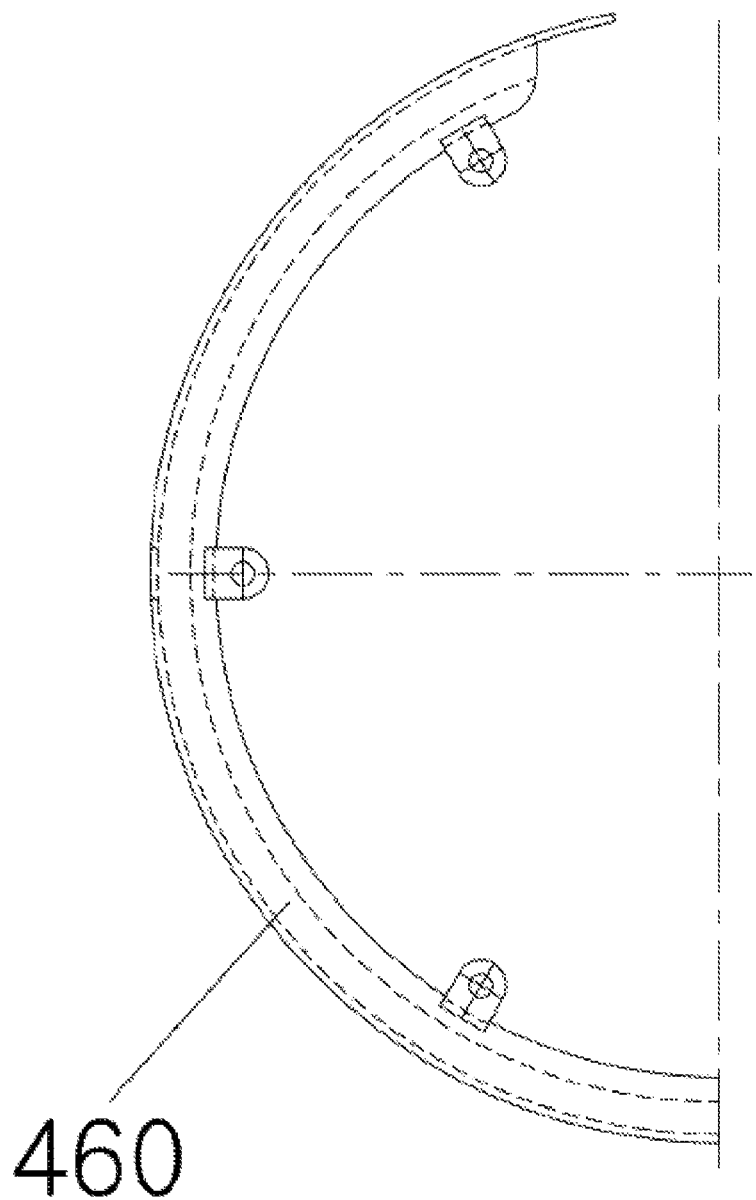
FIG. 10 is a view showing the second gear cover of the excavator according to the embodiment of the present invention.

Furthermore FIG. 3, as shown in FIGS. 9 and 10, a second gear cover 460 configured to protect the driven gear 433 may be coupled to the first body 410. The second gear cover 460 may be installed on the first body 410 to surround the outer circumferential surface of the driven gear 433 except for the portion where the drive gear 432 and the driven gear 433 are engaged with each other. As shown in FIG. 10, the second gear cover 460 may include two parts, i.e., left and right parts. Only the left part is shown in FIG. 10.

Next, a rotary joint 800 configured to maintain the feeding of hydraulic energy during the rotation of the second body 420 is described.

Since the boom cylinder 300, the arm cylinder 500, and the bucket cylinder 700 receive hydraulic energy from the hydraulic pump (not shown) provided in the vehicle body 100 and are operated using the hydraulic energy, hydraulic hoses (not shown) or the like configured to feeding hydraulic pressure are connected to the respective cylinders 300, 500 and 700. When the arm 400 is freely rotated, there is concern that the hydraulic hoses configured to feed hydraulic pressure to the arm cylinder 500 and the bucket cylinder 700 are entangled together and ruptured.

In order to overcome the above problem, in the present embodiment, there is proposed the rotary joint 800 disposed between the first body 410 and the second body 420 and configured to transfer oil so that the transfer of hydraulic energy from the hydraulic pump to the arm cylinder 500 and the bucket cylinder 700 can be maintained during the rotational movement of the second body 420 (see FIG. 3).

Figure 11:
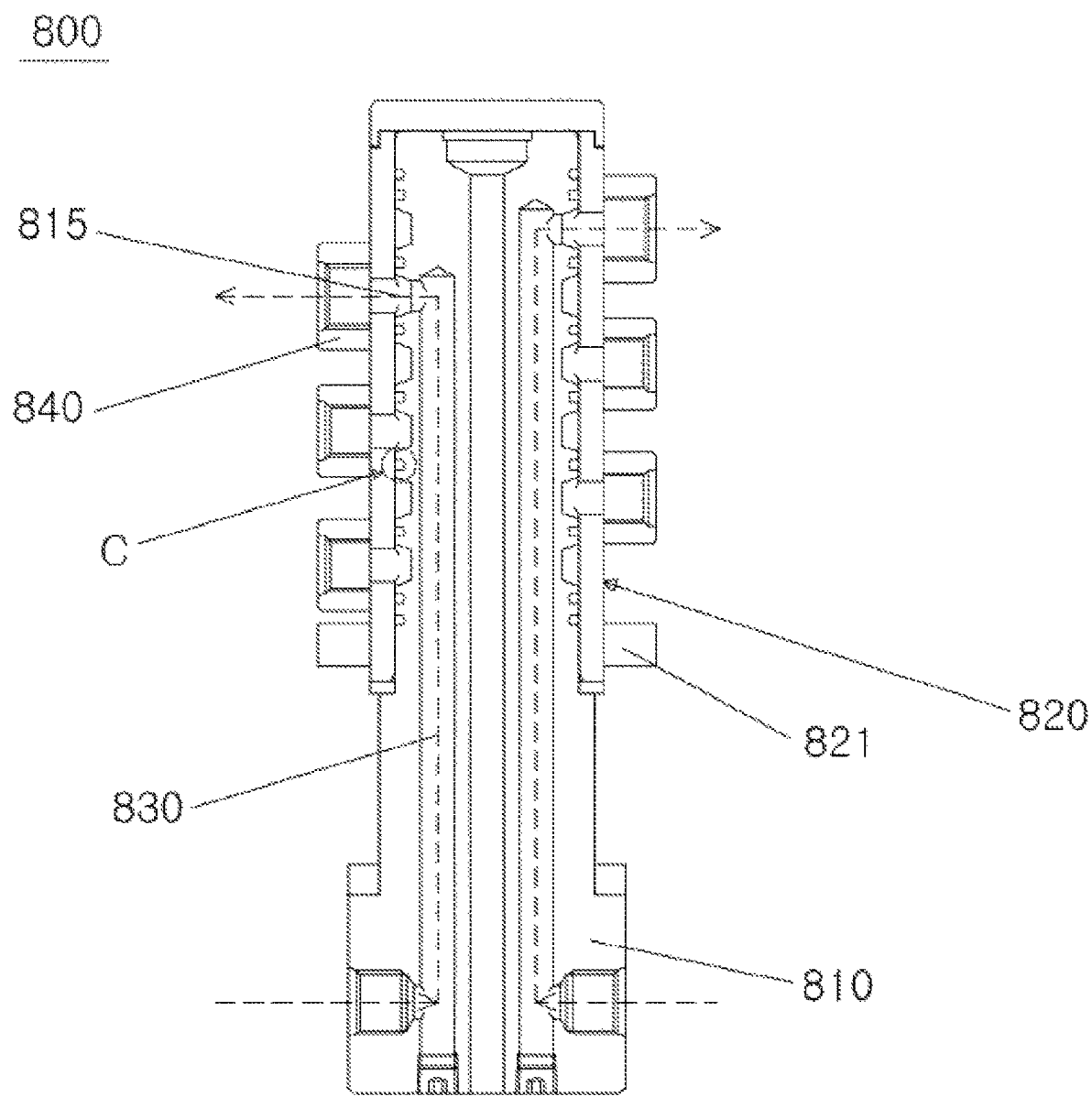
FIG. 11 is a sectional view showing the rotary joint of the excavator according to the embodiment of the present invention.

As shown in FIGS. 3 and 11, the rotary joint 800 may basically includes: a fixed part 810 configured such that one side thereof is inserted into the first body 410 and the other side thereof is inserted into the second body 420; and a rotating part 820 configured to surround the other side of the fixed part 810, coupled to the fixed part 810 so that it can be rotated through 360 degrees, and configured to be rotated along with the second body 420 in an integrated manner.

Figure 12:
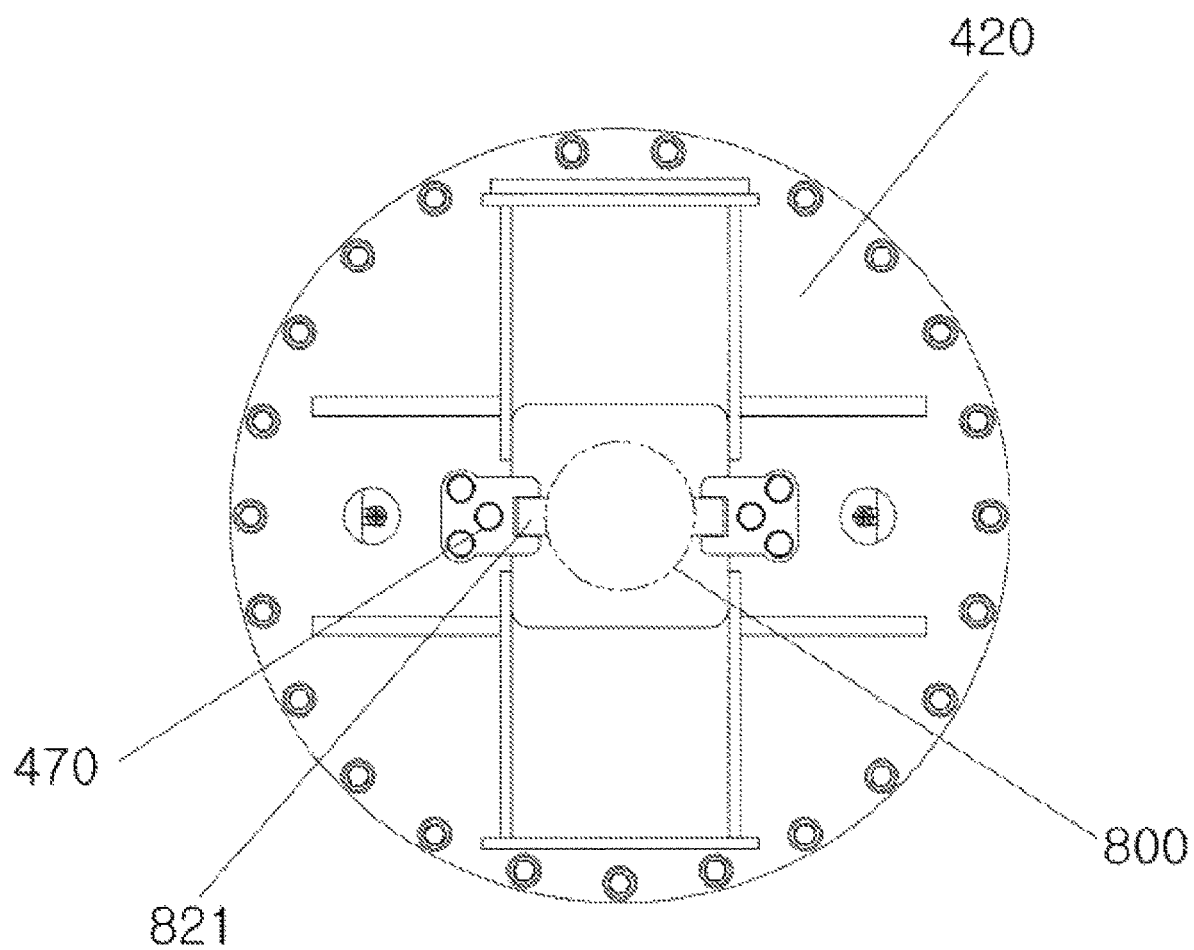
FIG. 12 is a side view viewed from direction "B" of FIG. 3.

In this case, as shown in FIG. 11, a catch protrusion 821 may be formed on the outer circumferential surface of the rotating part 820. As shown in FIGS. 3 and 12, a stopper 470 configured to be engaged with the catch protrusion 821 so that the rotating part 820 is rotated along with the second body 420 in an integrated manner is formed on the second body 420. In other words, the rotating part 820 and the second body 420 can be rotated in an integrated manner by the interference between the catch protrusion 821 of the rotating part 820 and the stopper 470 of the second body 420.

As shown in FIG. 11, flow passages 830 configured to transfer oil, fed from the hydraulic pump (not shown), to the individual cylinders through a hydraulic hose (not shown) or the like are formed in the fixed part 810. The flow passages 830 are configured to extend from one side of the fixed part 810 in a direction toward the other side of the fixed part 810 through the inside of the fixed part 810 and to communicate with the outer circumferential surface of the fixed part 810. In other words, one end of each of the flow passages 830 is exposed to one side of the fixed part 810, and the other end of each of the flow passages 830 is exposed to the outer circumferential surface of the other side of the fixed part 810. The dotted line arrows of FIG. 11 indicate paths along which hydraulic pressure is transferred through the flow passages 830.

Figure 13:
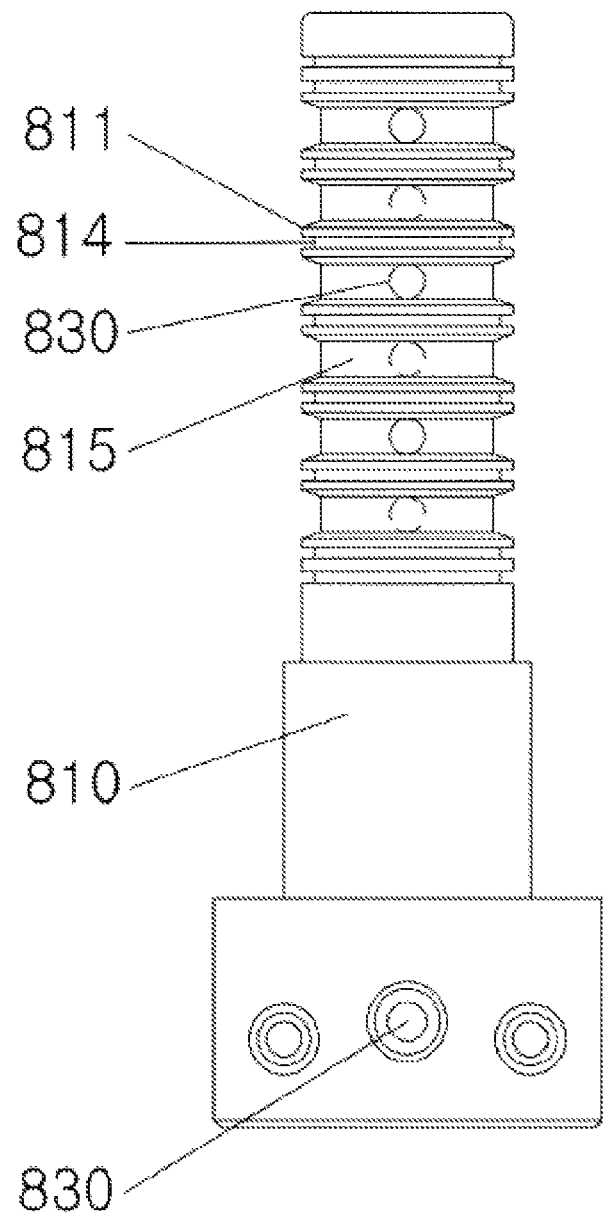
FIG. 13 is a view showing the fixed part of the rotary joint of the excavator according to the embodiment of the present invention.

As shown in FIG. 11 and FIG. 13, channels 815 shaped to surround the outer circumferential surface of the fixed part 810 are formed through the outer circumferential surface of the other side of the fixed part 810 to which the other end of each of the flow passages 830 is exposed. Since these channels 815 communicate with the respective flow passages 830, hydraulic pressure, i.e., oil, fed through the flow passage 830 can be circulated along the outer circumferential surface of the fixed part 810 through the channels 815.

As shown in FIGS. 11 and 13, the other end of the fixed part 810 is surrounded by the rotating part 820 and the rotating part 820 covers the channels 815, with the result that circulative flow passages connectable throughout 360 degrees can be implemented by the inner circumferential surface of the rotating part 820, the outer circumferential surface of the fixed part 810, and the channels 815.

Figure 14:
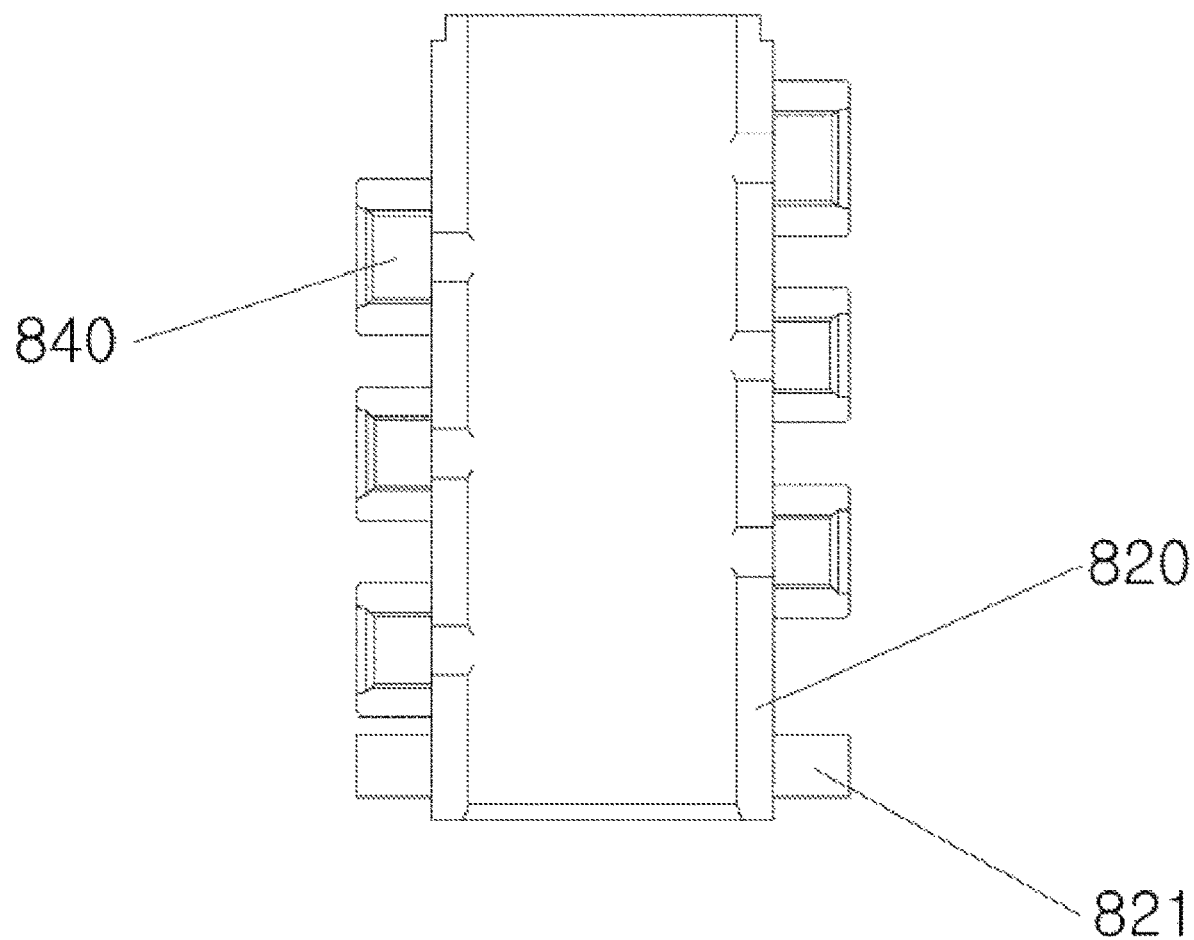
FIG. 14 is a view showing the rotating part of the rotary joint of the excavator according to the embodiment of the present invention.

As shown in FIGS. 11 and 14, ports 840 configured to communicate with the respective channels 815 are formed on the rotating part 820. Hydraulic hoses (not shown) or the like are connected to the ports 840, and thus oil can be transferred to the arm cylinder 500 or bucket cylinder 700.

According to the above-described structure, even when the second body 420 constituting part of the arm 400 is rotated throughout 360 degrees around the lengthwise axis thereof, the feeding of oil can be stably maintained via the flow passages 830 passing through the fixed part 810 and the channels 815 formed along the outer circumferential surface of the fixed part 810.

Meanwhile, the numbers of flow passages 830, channels 815, and ports 840 may vary depending on the numbers of channels configured to transfer hydraulic pressure in various manners. In this case, the flow passages 830, the channels 815, and the ports 840 are each plural in number, and the numbers of flow passages 830, channels 815, and ports 840 are the same as one another according to a one-to-one correspondence.

Figure 15:
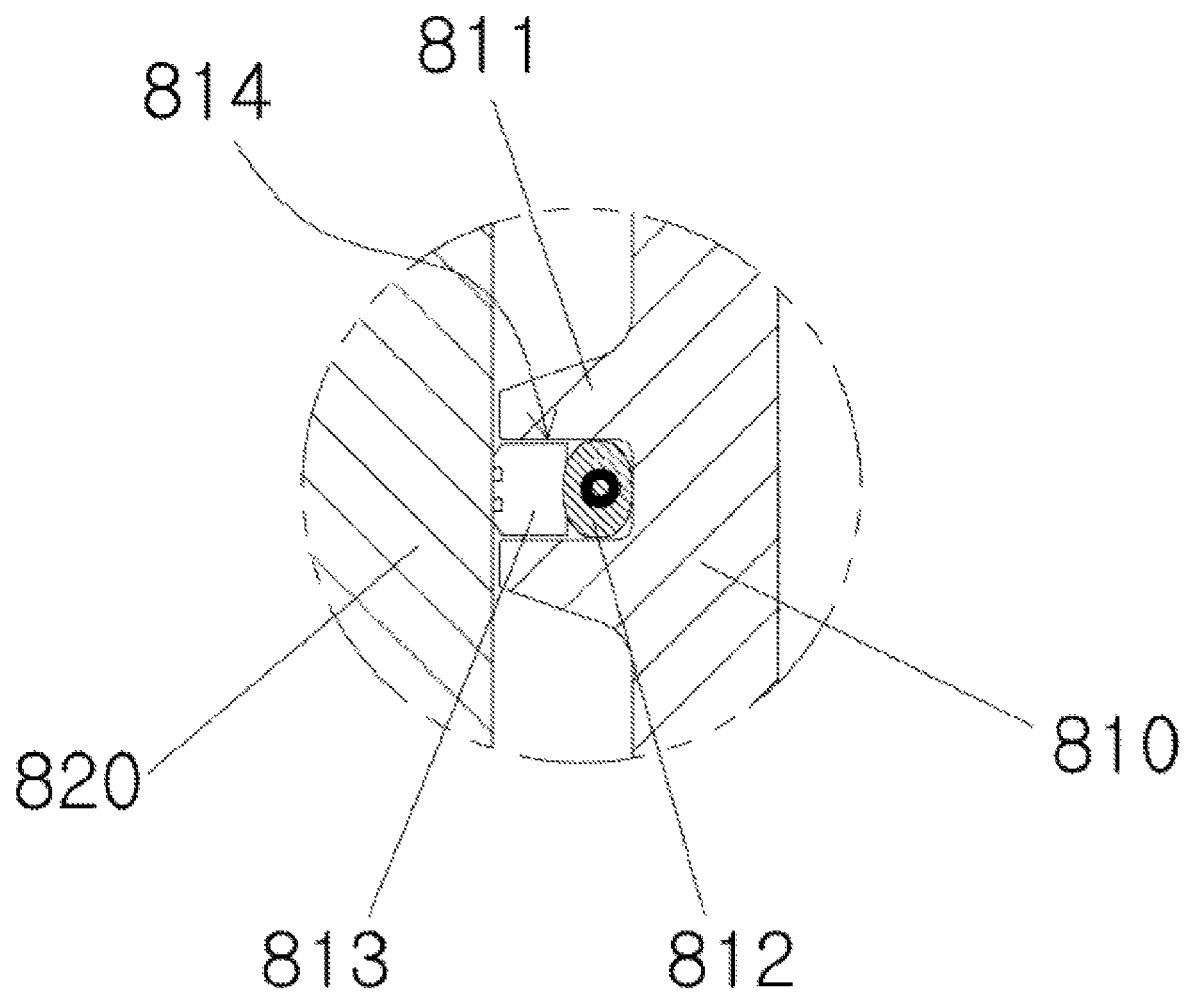
FIG. 15 is a partially enlarged view showing portion "C" of FIG. 11.

When the flow passages 830, the channels 815, and the ports 840 are each formed to be plural in number as described above, it is necessary to prevent interference from occurring between the adjacent channels 815. For this purpose, as shown in FIGS. 11 and 15, sealing grooves 814 each using a pair of partitions 811 are formed between the adjacent channels 815, and sealing members 812 and 813 made of rubber and Teflon are inserted into the sealing grooves, thereby implementing reliable sealing between the channels 815.

Although the foregoing description has been given with reference to the preferred embodiment of the present invention, it will be understood by a person having ordinary knowledge in the corresponding art that the present invention may be modified and altered in various manners without departing from the spirit and scope of the present invention described in the claims.

In addition to the above-described embodiments, many embodiments are present within the claims of the present invention.

The invention claimed is:
1. An excavator having a rotatable arm, the excavator comprising:
a vehicle body configured to have a hydraulic pump;
a boom connected to the vehicle body at one end thereof;
a boom cylinder coupled between the vehicle body and the boom, and configured to receive hydraulic energy from the hydraulic pump and operate the boom;
an arm connected to a remaining end of the boom;
an arm cylinder coupled between the boom and the arm, and configured to receive hydraulic energy from the hydraulic pump and operate the arm;
a bucket connected to an end of the arm; and
a bucket cylinder coupled between the arm and the bucket, and configured to receive hydraulic energy from the hydraulic pump and operate the bucket;

wherein the arm comprises:
a first body connected to the remaining end of the boom;
a second body configured such that one end thereof is coupled to the first body so that it is rotatable through 360 degrees and a remaining end thereof is connected to the bucket; and
a rotation module interposed between the first body and the second body, and configured to enable rotational movement of the second body; and
wherein the rotation module comprises:
a bearing including an inner ring coupled to the first body and an outer ring rotatably coupled to the inner ring and coupled to the second body;
a hydraulic motor coupled to the first body, and configured to receive hydraulic energy from the hydraulic pump and generate rotating force intended for rotational movement of the second body;
a drive gear coupled to a shaft of the hydraulic motor; and
a driven gear formed on an outer circumferential surface of the outer ring, and configured to be engaged with the drive gear and receive rotating force of the hydraulic motor through the drive gear,
wherein the arm further comprises a rotary joint disposed inside the first body and the second body and configured to transfer oil so that transfer of hydraulic energy from the hydraulic pump to the arm cylinder and the bucket cylinder can be maintained during rotational movement of the second body, wherein the rotary joint comprises:
a fixed part configured such that one side thereof is inserted into the first body and a remaining side thereof is inserted into the second body; and
a rotating part configured to surround an outer circumferential surface of the remaining side of the fixed part, coupled to the fixed part so that it can be rotated through 360 degrees, and configured to be rotated along with the second body in an integrated manner, wherein the second body is configured such that a predetermined space for connecting hydraulic hoses to the rotating part is provided between the rotating part and an inner surface of the second body;
wherein flow passages configured to transfer oil fed from the hydraulic pump are formed in the fixed part;
wherein the flow passages are configured to extend from one side of the fixed part in a direction toward a remaining side of the fixed part through an inside of the fixed part and to communicate with an outer circumferential surface of the fixed part, and channels connected to the flow passages and shaped to surround the outer circumferential surface of the fixed part are formed through an outer circumferential surface of the remaining side of the fixed part; and
wherein ports configured to communicate with the respective channels and to transfer oil to the arm cylinder or bucket cylinder are formed on the rotating part,
wherein the flow passages, the channels, and the ports are each formed by six wherein:
a sealing groove is formed between each adjacent two of the six channels; and
a sealing member is inserted into the sealing groove,
wherein first, third, and fifth ports are arranged in a row on a side of an outer circumferential surface of the rotating part and connected to corresponding first, third, and fifth channels, respectively, and
second, fourth, and sixth ports are arranged in a row on an opposite side of the outer circumferential surface of the rotating part and connected to corresponding second, fourth, and sixth channels, respectively.

2. The excavator of claim 1, wherein:
- a catch protrusion is formed on the outer circumferential surface of the rotating part; and
- a stopper configured to be engaged with the catch protrusion so that the rotating part is rotated along with the second body in an integrated manner is formed on the second body.

3. The excavator of claim 1, wherein the rotation module further comprises a relief valve configured to prevent pressure of oil fed to the hydraulic motor from increasing above a preset threshold value.

4. The excavator of claim 1, wherein the rotation module further comprises a hydraulic brake configured to maintain a rotated angle of the second body by blocking rotational movement of the shaft of the hydraulic motor when the hydraulic motor does not operate.

5. The excavator of claim 1, wherein the arm further comprises:
- a motor bracket configured to protrude outward from the first body and protect the hydraulic motor; and
- a first gear cover configured to be coupled to the motor bracket and protect the drive gear.

6. The excavator of claim 5, wherein the arm further comprises a second gear cover configured to be coupled to the first body and protect the driven gear.

* * * * *